United States Patent Office 3,598,741

Patented Aug. 10, 1971

3,598,741

ACID COMPOUND FOR METAL SURFACE

Shozo Kanno, Kobe, Japan, assignor to Chugai Kasei Co., Ltd., Osaka, Japan

No Drawing. Filed Oct. 7, 1969, Ser. No. 864,535
Claims priority, application Japan, Oct. 7, 1968, 43/73,022, 43/73,023
Int. Cl. C23f *1/00;* C23g *1/02*
U.S. Cl. 252—79.3 11 Claims

ABSTRACT OF THE DISCLOSURE

Compositions having suitable viscosities for the cleaning and etching of metals comprising hydrofluoric acid, magnesium and at least one acid or salt of an acid selected from the group consisting of nitric acid, phosphoric acid, sulfuric acid and sulfonic acid.

BACKGROUND OF THE INVENTION

This invention relates to an acidic composition for cleaning and for etching of metal. More particularly, it relates to an acidic chemical composition for the cleaning and etching of metal which has a desired viscosity making it possible to apply the same by means of a brush, by flowing or by spraying. Even more particularly, the invention relates to acidic compositions or "compounds" containing hydrofluoric acid, magnesium and at least one other acid or salt, as defined hereinbelow.

The expression "cleaning" as used in this application is defined as the removal of scales, rust, corrosion, oxidation substances, stains and other deposits, which are nonmetallic substances, from metal surfaces, thereby exposing the bare metal surface. The chemical mixtures employed in the present invention can be referred to as an "acid compound," but this expression should not be taken to mean "chemical compound" in the ordinary sense of the term but, rather, a specific substance prepared by blending or mixing together several chemical substances. Since the resultant mixture does not necessarily form a single "chemical compound," but constitutes a blend having a hybrid character of the mixture and the respective chemical components thereof, it will be referred to hereinafter as a "composition."

Compositions containing hydrofluoric acid for use on metal surfaces have been conventionally used in the art for cleaning considerably firm scales, oxide films and the like off the surface of metals such as stainless steel, heat-resisting steels, titanium or aluminum. These compositions, containing hydrofluoric acid, are also effective in cleaning scales or oxide films off the surfaces of other metals, wherein compositions that do not contain hydrofluoric acid are substantially ineffective.

In using such chemical compositions with various metals, it is necessary to apply the composition in various ways, such as applying by means of a brush or by spraying, flowing or immersing, depending on the shape, size and material of the object, particularly when the object is quite large or when the object is composed of several materials of different kinds of which some of the components are delicate enough to be damaged by the composition. In case that the object surface is vertical, the conventional compositions having a low viscosity are not economically applicable, because a very small part of the applied composition stays on the vertical surface. In such a case, it is necessary that the composition have an appropriate viscosity. In this manner, a composition having an appropriate viscosity can be retained on a vertical surface of metal for a desired time in a desired amount, enabling easy cleaning of heavy scales of large sizes and thereby promoting economy in applying the composition.

Some viscosity-increasing additives have been used in conventional cleaning compositions in order to attain the appropriate viscosity because it was not possible to attain such a viscosity by components having a cleaning function only. Various kinds of high molecular weight substances, such as cellulose derivatives, for example, starch, agar-agar, carboxymethylcellulose or hydroxymethylcellulose, or inorganic substances, for example, diatomaceous earth, various clays or bentonite, have been conventionally used as additives.

Among these viscosity-increasing additives, organic substances are apt to be hydrolyzed in an acid solution, thereby decreasing their molecular weights and hence decreasing the viscosity of the composition. This is particularly true of the carbohydrate additives. Even hydroxypropyl methylcellulose, which is believed to be highly resistant to the acids, is hydrolyzed with the passage of time, with the result that its viscosity is lost in a few days. On the other hand, conventionally used inorganic viscosity-increasing additives, which primarily comprise silicic acid and, additionally, include aluminum oxide or another component, have been used in compositions containing ordinary acids. However, these inorganic additives dissolve in a composition comprising hydrofluoric acid, resulting in losing the cleaning function of the acid as well as in increasing the viscosity through a formation of hydrosilicofluoric acid and of aluminum oxide.

The present inventor has conducted much research in order to overcome the above problems concerning the production of an acidic composition for cleaning or etching metal surfaces comprising hydrofluoric acid and which has a necessary and desired viscosity. As a result, it has become possible to overcome the above-mentioned problems without deteriorating the cleaning function of the composition.

Accordingly, one of the objects of the present invention is to provide acidic cleaning compositions for metals which overcomes the disadvantages and deficiencies of the prior art materials.

Another object of the present invention is to provide acidic compositions of the type described which have a suitable viscosity while maintaining a good cleaning or etching action.

A further object of the invention is to provide cleaning compositions for metal surfaces which contain hydrofluoric acid.

A still further object of the invention is to provide hydrofluoric acid-containing cleaning or etching agents for metal surfaces which can be applied by brushing, by flowing, by spraying, by immersing or as desired because of the suitable viscosity thereof.

These and other objects and advantages of the present invention will become apparent to those skilled in the art from a consideration of the following specification and claims.

SUMMARY OF THE INVENTION

In accordance with the present invention, it has been found that the above objectives can be attained by providing an acidic composition comprising hydrofluoric acid, magnesium and at least one other additive selected from the group consisting of nitric acid, phosphoric acid, sulfuric acid and sulfonic acids having the chemical formula $XSO_3H$, wherein X is an aryl radical, an alkaryl radical or an alkyl radical. Said acids include not only the free acid but also suitable salts thereof, particularly the inorganic salts.

The magnesium employed in the compositions of the invention is obtained from sources such as metallic magnesium and magnesium salts, for example, magnesium oxide, magnesium carbonate, magnesium nitride, magnesium phosphate, magnesium sulfate and magnesium salts of said sulfonic acids. Therefore, in this application, the term "magnesium" is used to include magnesium salts of this type.

The hydrofluoric acid, the nitric acid, the phosphoric acid, the sulfuric acid, the sulfonic acid or their salts contained in the composition is provided in the form of the free acid, a magnesium salt thereof or from any other salt which can impart the acid radical of these acids through hydrolysis in an acid solution. Therefore, terms such as "hydrofluoric acid," "nitric acid," "phosphoric acid," "sulfuric acid" and "sulfonic acid" are used in this application to include the suitable respective salts thereof.

As the sulfonic acid, aryl sulfonic acids or alkaryl sulfonic acids can be employed. Examples thereof include benzenesulfonic acid, toluenesulfonic acid, xylenesulfonic acid, naphthalenesulfonic acid, ethylbenzene-sulfonic acid, or propylbenzene-sulfonic acid. Dodecylbenzenesulfonic acid having 12 carbon atoms in the alkyl radical thereof is preferred, because it is readily available and effects a good performance. Propylnaphthalene-sulfonic acid, butylnaphthalene-sulfonic acid, eicosylbenzene-sulfonic acid, etc. can also be employed as the sulfonic acid component. Groups containing 28 or less carbon atoms are preferable as the aryl radical or alkaryl radical contained in the sulfonic acid. Sulfonic acid radicals containing 26 or less carbon atoms are even more preferable as effecting a sufficient dispersion. Sulfonic acid radicals containing 29 or more carbon atoms are not preferred because of poor dispersion properties.

Alkylsulfonic acids which may be employed include, for example, decanesulfonic acid, hexadecanesulfonic acid, octadecanesulfonic acid, docosanesulfonic acid, hexacosanesulfonic acid, etc. Among these substances, acids having alkyl radicals containing from 6 to 30 carbon atoms are preferred. When the number of carbon atoms is less than 6, the viscosity-increasing effect is low, and when the carbon number exceeds 30, an acceptable dispersion cannot be obtained.

The hydrofluoric acid is added to the composition of the invention principally for obtaining a cleaning and etching effect, rather than for obtaining a viscosity-increasing effect. Although the hydrofluoric acid has a considerable effect in increasing the viscosity, the desired viscosity is really obtained by means of the other components.

The degree of concentration of the components in the composition of the invention can be selected in a wide range. The concentration of hydrofluoric acid should be from about 1% to about 65% by weight of the resultant composition. At a concentration of hydrofluoric acid of less than about 1%, the function of cleaning or etching by the composition is not sufficient. At a concentration of more than about 65%, the volatility of the hydrofluoric acid is too high, making the handling of the cleaning or etching composition dangerous.

The viscosity can be increased by adding the magnesium to the composition in a certain proportion with respect to the amount of component acids. Thus, the relation between the amount of added magnesium and the viscosity changes, depending on the amount of component acids. The maximum viscosity can be attained at the proportion between amounts of the component acids and the magnesium when they are almost equivalent chemically to form magnesium salts of such acids, and especially acid salts thereof. On the contrary, the amount of magnesium should be limited to the lowest possible value for obtaining a desired viscosity, because it is preferred to keep the amount of added magnesium as small as possible in order to obtain a high concentration of free acids, i.e., active acids which are effective for cleaning or etching metals. The concentration of magnesium preferably ranges from about 0.1% to about 20% by weight. At a concentration of magnesium of less than about 0.1%, the viscosity-increasing effect cannot be obtained. At a concentration of more than about 20%, the composition is solid and a fluidity or plasticity cannot be obtained. One, two or more acids selected from the group consisting of nitric acid, phosphoric acid, sulfuric acid and sulfonic acids are added to the composition and have the effect of increasing the viscosity of the composition cooperatively with the hydrofluoric acid and magnesium. Any acid selected from the above group is capable of increasing the viscosity of the composition by the addition of only a small amount, and greater additions increase the viscosity thereof. As already mentioned above, the maximum viscosity can be obtained when the amount of component acids is approximately equivalent chemically with respect to the magnesium to form magnesium salts of these acids, and especially acid salts thereof. Acids selected from the above-listed group give a stable viscosity to the composition. When contained therein, said acids have a cooperative and complementary effect in increasing the viscosity.

The sulfonic acid is added to the composition in a wide quantitative range without interfering with the performance of the cleaning or etching effect and, therefore, a desired viscosity of the composition can be obtained while retaining the cleaning or etching effect provided by the composition with the hydrofluoric acid and other components. Moreover, because the sulfonic acid provides the composition with a high viscosity when present with highly concentrated free acid even with a small addition of magnesium, it is possible to prepare a composition having a powerful effect as well as a desired viscosity for cleaning and for etching of metals.

When nitric acid is employed as a component, its concentration is chosen in a range of from about 1% to about 70% weight. At a concentration of less than about 1%, the viscosity-increasing effect and the cleaning or etching are not sufficient. At a concentration of more than about 70%, the volatility of the nitric acid is too high, making the handling of the composition dangerous.

When phosphoric acid is employed as a component, the concentration thereof ranges from about 1% to about 90% by weight. At a concentration of less than about 1%, the viscosity-increasing effect and the cleaning or etching effect are not sufficient. At a concentration of more than about 90%, the cleaning or etching effect is lowered.

When sulfuric acid is employed as a component, its concentration is chosen in a range of from about 0.1% to about 90% by weight. At a concentration of less than about 0.1%, the viscosity-increasing effect and the cleaning or etching effect are not sufficient. At a concentration of more than about 90%, the volatility becomes too high, again making the handling of the composition dangerous.

When sulfonic acid is employed as a component, its concentration is chosen in a range of from about 0.1% to about 98% by weight, again based on the weight of the composition. At a concentration of less than about 0.1%, the viscosity-increasing effect is not sufficient. At a concentration of more than about 98%, the cleaning or etching effect and the viscosity-increasing effect are not sufficient.

When the acidic composition of the present invention is applied to metals such as stainless steel, titanium or aluminum, the effects of the respective acids are as follows. The nitric acid accelerates the solubility of "smut" which develops on the metal surface during the chemical reaction on the scale, thereby ensuring an even cleaning or etching. The phosphoric acid prevents interangular corrosion, thereby moderating the action of the composition and preventing over-etching. The sulfuric acid promotes cleaning, even with a small amount thereof. The sulfonic acid removes oily stains and organic paints and coatings from the metal surface.

The composition of the present invention is prepared by selecting the kind and amount of said components in accordance with the intended use. For instance, in order to attain a strong cleaning or etching action, the hydrofluoric acid and other acid components which are effective in cleaning and etching are selected. Then, an appropriate amount of magnesium and an appropriate amount of a sulfonic acid which promotes the viscosity-increasing performance are added. These components are agitated together, thereby giving the desired composition. A small quantity of a surface-active agent may be added to the composition in order to promote the cleaning or etching effect. Also, an appropriate amount of an inhibitor may be added in order to prevent over-etching. The composition of the present invention may be used after dilution with water so as to obtain a suitable viscosity, depending upon the intended use and the desired mode of application. The final composition has the appearance of a transparent or opaque jelly or cream.

The theoretical explanation for why such an effective and stable viscosity is attained by this invention has not yet been clarified. Although the present invention is not to be limited by the veracity of any theoretical explanation thereof, it may be reasonably surmised that the substance which causes the viscosity in the composition is not a mere salt or mixture, but is perhaps a substance formed by a multiple combination with the addition of the hydrofluoric acid, magnesium and at least one of nitric acid, phosphoric acid, sulfuric acid, sulfonic acid and water, and that said multiple combined substance seems to be the cause of the colloidal nature of the composition. For instance, an example of the composition containing hydrofluoric acid, magnesium sulfate and water has a transparent and jelly-like appearance. This is presumed to be caused by a formation of unknown colloidal substances different from either magnesium fluoride or magnesium sulfate. Another example of the composition has a semi-transparent and jelly-like appearance, and this is presumed to be caused by a formation of a colloidal substance different from any of the magnesium salts of the component acids, namely, hydrofluoric acid, sulfuric acid or propylnaphthayene-sulfonic acid.

In the present invention, the appropriate amount of magnesium required for obtaining a viscosity suitable for use can be made very small. For instance, a simple composition consisting essentially of only hydrofluoric acid and magnesium is required to contain at least 9% of magnesium, when the compound contains 85% of hydrofluoric acid of 55% concentration, in order to attain a suitable viscosity. With any less content of magnesium, the viscosity is poor. However, in the present invention, a composition of high viscosity can be obtained by a small addition of the magnesium. For instance, in one of the exemplary compositions, containing 10% of hydrofluoric acid of 55% concentration, 40% of phosphoric acid of 75% concentration, 17.4% of magnesium dodecylbenzene sulfonate, 13.6% of dodecylbenzene sulfonic acid and 10% of water, the amount of the magnesium is only 0.6%. As will be exemplified hereunder by various examples, in accordance with the present invention, the composition can be prepared with even a less amount of magnesium.

The viscosity of the composition in this invention is shown hereunder by means of a unit called the "spread area," which exhibits the reverse value of the viscosity. The "spread area" in this invention is defined as an area which is measured in the manner that 5 cc. of a composition is dropped onto a horizontally placed smooth polyethylene plate, from a nozzle having a round downward opening of 2 mm. diameter and placed 5 cm. above said polyethylene plate, at an even dropping rate for 20 seconds. Then, the area of the spread composition is measured after a lapse of 2 minutes from the finish of said dropping, the procedure being conducted at temperatures of 20° C. ±1° C. By such measurement, the "spread area" of distilled water is 22.5 cm.$^2$ and that of said simple hydrofluoric acid-magnesium composition is 8.3 cm.$^2$, while that of the latter exemplary composition is 1.7 cm.$^2$. A conventional cleaning solution for stainless steel consisting of 5% of hydrofluoric acid of 55% concentration, 25% of nitric acid of 67.5% concentration and 70% of water has a "spread area" of 21.7 cm.$^2$.

The viscosity is large when the "spread area" is small, as is described above, and the composition is plastic like a jelly having no fluidity at all at a "spread area" of less than 3 cm.$^2$. However, the composition becomes slightly more fluid and gains an appearance like a cream at a "spread area" of around 5 cm.$^2$, and gains more fluidity at a "spread area" of over 10 cm.$^2$.

The composition of the present invention exhibits a larger viscosity than said simple hydrofluoric acid-magnesium mixture. Moreover, the composition of the present invention has a colloidal appearance resembling a jelly or cream, and its viscosity can be widely selected in accordance with the intended use. Furthermore, the viscosity of the composition of the present invention remains stable, the composition exhibiting a good durability.

The composition of the invention also has the feature that a sufficient amount of active or free acid is stably retained therein, because only a small amount of magnesium is required and, therefore, a decrease of the active or free acid because of a large amount of magnesium and a resultant interference with the cleaning function do not take place. This feature of the invention is derived from the necessary and sufficient condition of the composition comprising hydrofluoric acid, magnesium and at least one other additive selected from the group consisting of nitric acid, phosphoric acid, sulfuric acid and sulfonic acids. Especially, when a sulfonic acid is selected as an additive, a desired viscosity of the "compound" or composition of the invention can be obtained without lowering the cleaning function. Hence compositions having a cleaning or etching action, as well as a stable and sufficient viscosity suitable for the respective purposes in a wide range, can be obtained because the requirements of the components for attaining the desired viscosity are flexible, and the components act to complement each other.

Among the compositions covered by the present invention, the mixtures consisting solely of inorganic substance components can be readily prepared with a quick attainment of chemical equilibrium, and they are stable for a long time without the occurrence of undesirable and unnecessary chemical changes or reactions during storage. The compositions of the present invention containing sulfonic acid are also stable for a long time, because the sulfonic acid has a good stability which is a feature of aryl sulfonic acids, alkylaryl sulfonic acids and alkyl sulfonic acids, as contrasted with carbohydrates. Accordingly, the composition of the invention does not show a decrease of viscosity or a precipitation into the solid state of the component materials and, therefore, has a good durability.

Various kinds of acidic compositions for cleaning and for etching metal surfaces can be obtained according to the present invention, ranging from those having high viscosities, i.e., having spread areas of less than 6 cm.$^2$ which are suitable for application to vertical or overhanging surfaces, to those having low viscosities, i.e., having spread areas of more than 10 cm.$^2$.

EXAMPLES OF THE INVENTION

The following examples are given merely as illustrative of the present invention are are not to be considered as limiting. Unless otherwise noted, the percentages therein and throughout the application are by weight. The percentages of the components in the compositions are given as a percent by weight of the total composition.

EXAMPLE 1

| | Percent |
|---|---|
| Nitric acid (67.5% concentration) | 75.0 |
| Magnesium carbonate | 31.4 |
| Hydrofluoric acid (55% concentration) | 10.0 |

(Resultant composition becomes 100.0%)

The above materials are blended and made to react to form a highly viscous mixture. The total of the percentages in the right column exceeds 100%, but actually, the carbon dioxide gas is given off at reaction, and therefore, the resultant composition becomes 100.0%. The same explanation applies also in the subsequent examples in the expression "(Resultant composition becomes 100%.)." The spread area of this composition is 1.6 cm.$^2$. The spread area after storing the composition for 30 days at temperatures of 20° C.±1° C. is also 1.6 cm.$^2$, there being no change at all. This composition can remove welding scales on a 5 mm. thick plate of titanium [of Japanese Industrial Standard (hereinafter indicated JIS) H4600 TP28, namely containing H:max 0.05á; O:max 0.20%; N:max 0.05%; Fe:max 0.20% and having a tensile strength of 28 kg./mm.$^2$] in 30 minutes, and no over-etching is observed.

A composition prepared by adding 35% of water to the above-mentioned mixture has a transparent cream-like appearance and a spread area of 9.9 cm.$^2$ and is capable of removing welding scales from a 1 mm. thick plate of titanium (of JIS TP49, namely containing H:max 0.05%; O:max 0.40%; N:max 0.07%; Fe:max 0.40% and having a tensile strength of 49 kg./mm.$^2$) by an application for 5 to 10 minutes.

EXAMPLE 2

| | Percent |
|---|---|
| Phosphoric acid (75% concentration) | 2.0 |
| Hydrofluoric acid (55% concentration) | 84.0 |
| Magnesium carbonate | 29.3 |

(Resultant composition becomes 100.0%)

The composition prepared by blending and reacting the above components has a spread area of 4.9 cm.$^2$ and shows a cream-like appearance. Heat scales formed by arc-welding on a stainless steel [of American Iron and Steel Institute Standard (hereinafter indicated AISI) 304] can be removed by applying this composition for 2 hours. Rust on the stainless steel is removed at the same time. The spread area of this composition after storing for 30 days at temperatures of 20° C.±1° C. is 4.8 cm.$^2$, exhibiting no substantial lowering.

EXAMPLE 3

| | Percent |
|---|---|
| Phosphoric acid (75% concentration) | 1.0 |
| Hydrofluoric acid (70% concentration) | 88.0 |
| Magnesium carbonate | 21.0 |
| Eicosylbenzene-sulfonic acid | 0.5 |

(Resultant composition becomes 100.0%)

The composition obtained by blending and reacting the above components has a spread area of 6.9 cm.$^2$ and a cream-like appearance. A fine satin-like etched surface can be obtained by applying this composition for 2 hours to an exposed part of stainless steel (of AISI 304) covered by paraffin wax, excepting an ornamental pattern. The etching depth is about 0.3 mm. Etching by this composition requires a smaller quantity of the composition; also there is no need of covering the whole part of the object matter with wax, because the etching can be done by applying the cream-like mixture only to a necessary limited part of the object matter, instead of immersing the whole part thereof. Moreover, an etching bath is not necessary and etching is even and fine.

EXAMPLE 4

| | Percent |
|---|---|
| Magnesium sulfate (heptahydrate) | 70.0 |
| Hydrofluoric acid (55% concentration) | 20.0 |
| Water | 10.0 |
| Total | 100.0 |

The composition obtained by blending and reacting the above component materials has a spread area of 1.6 cm.$^2$, having almost no fluidity and showing a transparent cream-like appearance. The spread area of this composition stored for 30 days at temperatures of 20° C.±1° C. is also 1.6 cm.$^2$. The heat scales on a titanium plate (of JIS TP49) of 1 mm. thickness can be removed by a 30 minute application of this composition.

EXAMPLE 5

| | Percent |
|---|---|
| Hydrofluoric acid (55% concentration) | 50.0 |
| Water | 22.7 |
| Magnesium carbonate | 56.7 |
| Dodecylbenzenesulfonic acid | 0.2 |

(Resultant composition becomes 100.0%)

The composition obtained by blending and reacting the above component materials has a spread area of 1.5 cm.$^2$. The spread area of this composition after storing for 30 days at temperatures of 20° C.±1° C. is 1.5 cm.$^2$. Arc-welding scales on a stainless steel plate (of AISI 304L) can be removed by application of this composition for 2–3 hours.

EXAMPLE 6

| | Percent |
|---|---|
| Hydrofluoric acid (55% concentration) | 50.0 |
| Water | 22.6 |
| Magnesium carbonate | 56.7 |
| Decanesulfonic acid | 0.3 |

(Resultant composition becomes 100.0%)

The composition obtained by blending and reacting the above components has a spread area of 1.6 cm.$^2$, and after storing the compound for 30 days at temperatures of 20° C.±1° C. the spread area is also 1.6 cm.$^2$. Arc-welding scales on a stainless steel (of AISI 304L) can be removed in 2 to 3 hours by application of this composition.

EXAMPLE 7

| | Percent |
|---|---|
| Hydrofluoric acid (55% concentration) | 16.5 |
| Magnesium oxide | 7.2 |
| Toluenesulfonic acid | 67.7 |
| Water | 8.6 |

(Resultant composition becomes 100.0%)

The spread area of the composition stored for 24 hours after preparation by blending and reacting the above component materials is 9.0 cm.$^2$, and the spread area after storing the composition for 60 days at temperatures of 20° C.±1° C. is 8.8 cm.$^2$. Heat scales on a heat-resisting steel (of AISI 310) can be removed by applying this composition for 30 to 120 minutes.

EXAMPLE 8

| | Percent |
|---|---|
| Hydrofluoric acid (55% concentration) | 16.5 |
| Magnesium oxide | 7.2 |
| Docosanesulfonic acid | 67.7 |
| Water | 8.6 |
| Total | 100.0 |

The spread area of the composition stored for 24 hours after preparation by blending and reacting the above component materials is 8.5 cm.$^2$, and the spread area after storing the composition for 30 days at temperatures of 20° C.±1° C. is 8.4 cm.$^2$. Heat scales on a heat-resisting steel (of AISI 310) can be removed by application of this composition for less than 2 hours.

EXAMPLE 9

| | Percent |
|---|---|
| Hydrofluoric acid (55% concentration) | 7.0 |
| Dodecylbenzenesulfonic acid | 90.0 |
| Magnesium oxide | 6.3 |

(Resultant composition becomes 100.0%)

The spread area of the total composition stored for 24 hours after preparation by blending and reacting the above component materials is 1.6 cm.$^2$, and the spread area after storing the composition for 60 days at temperatures of 20° C.±1° C. is also 1.6 cm.$^2$, showing no change. Welding scales on a stainless steel (of AISI 316) can be cleaned by application of this composition for about 1 hour.

EXAMPLE 10

| | Percent |
|---|---|
| Magnesium nitrate (hexahydrate) | 65.3 |
| Nitric acid (67.5% concentration) | 4.9 |
| Phosphoric acid (75% concentration) | 7.8 |
| Hydrofluoric acid (55% concentration) | 22.0 |
| Total | 100.0 |

The composition obtained by blending and reacting the above component materials has a spread area of 1.7 cm.$^2$, and a transparent jelly-like appearance. Welding-scales on a stainless steel (of AISI 316) can be removed by application of this composition for 1 to 2 hours. The composition of this example has the feature that the over-etching action is safely low. The spread area of this compound mixture after storing for 6 months at normal temperatures is 1.7 cm.$^2$, showing no change of viscosity.

EXAMPLE 11

| | Percent |
|---|---|
| Hydrofluoric acid (55% concentration) | 25.0 |
| Nitric acid (67.5% concentration) | 2.0 |
| Sulfuric acid (98% concentration) | 20.0 |
| Sodium bifluoride | 5.0 |
| Water | 35.1 |
| Magnesium carbonate | 30.0 |

(Resultant composition becomes 100.0%)

The spread area of the composition obtained by blending and reacting the above component materials is 10.9 cm.$^2$. The spread area of this composition after storing for 30 days at temperatures of 20° C.±1° C. is 10.7 cm.$^2$. Heat scales on a stainless steel (of AISI 304) can be removed by applying this composition for 1 hour.

EXAMPLE 12

| | Percent |
|---|---|
| Hydrofluoric acid (55% concentration) | 20.0 |
| Phosphoric acid | 10.0 |
| Magnesium sulfate (heptahydrate) | 60.0 |
| Water | 10.0 |
| Total | 100.0 |

The composition obtained by blending and reacting the above component materials has almost a transparent jelly-like appearance and has a spread area of 1.7 cm.$^2$. This composition is suitable for removing corrosion, oxidation and stains on aluminum without over-etching. A grayish-white corrosion, oxidation and stain on a plate of aluminum [of Aluminum Association of USA standard (hereinafter indicated AA) 1100] weather-tested outdoors for 6 months can be removed by applying this composition for 5 to 30 minutes, recovering the white metallic luster of aluminum. The spread area after storing for 6 months at ordinary temperature is 1.6 cm.$^2$.

EXAMPLE 13

| | Percent |
|---|---|
| Hydrofluoric acid (55% concentration) | 22.0 |
| Phosphoric acid (75% concentration) | 9.0 |
| Magnesium sulfate (heptahydrate) | 55.0 |
| Water | 13.0 |
| Propylnaphthalene-sulfonic acid | 1.0 |
| Total | 100.0 |

The composition obtained by blending and reacting the above component materials has a jelly-like appearance, and a spread area of 1.6 cm.$^2$. This compound mixture is suitable for removing corrosion, oxidation and stains from aluminum without over-etching. Grayish-white corrosion, oxidation and stains on an aluminum plate (of AA–1100), weathered outdoors for 6 months, are removed by applying this composition for 5 to 30 minutes, recovering a white metallic luster of aluminum. The spread area after storing for 6 months at ordinary temperature is 1.6 cm.$^2$.

EXAMPLE 14

| | Percent |
|---|---|
| Ammonium bifluoride | 4.0 |
| Phosphoric acid (75% concentration) | 79.0 |
| Magnesium (metal) | 8.8 |
| Naphthalenesulfonic acid | 2.0 |
| Water | 6.5 |

(Hydrogen gas is expelled. Resultant composition becomes 100.0%)

The composition obtained by blending and reacting the above component materials has a spread area of 10.4 cm.$^2$. The spread area after storing for 30 days at temperatures of 20° C.±1° C. is 10.2 cm.$^2$. Welding-scales on a steel plate [of the American Society of Testing and Material standard (hereinafter indicated ASTM) A366–66T] can be removed by applying this composition for 60 minutes. The composition has a mild character, and there is no over-etching.

EXAMPLE 15

| | Percent |
|---|---|
| Hydrofluoric acid (55% concentration) | 10.0 |
| Phosphoric acid (75% concentration) | 40.0 |
| Magnesium dodecylbenzene sulfonate | 17.4 |
| Dodecylbenzenesulfonic acid | 13.6 |
| Water | 19.0 |
| Total | 100.0 |

The composition obtained by blending and reacting the above component materials has a spread area of 1.7 cm.$^2$, and the spread area after storing it for 30 days at temperatures of 20° C.±1° C. is also 1.7 cm.$^2$. Heat scales on stainless steel (of AISI 304) can be removed by applying this composition for 1 hour.

The composition obtained by adding the same amount of water the to above mixture has a spread area of 14.3 cm.$^2$. It can remove heat scales on stainless steel (of AISI 403) by applying it for 1 to 2 hours.

EXAMPLE 16

| | Percent |
|---|---|
| Hydrofluoric acid (55% concentration) | 8.0 |
| Sulfuric acid (98% concentration) | 74.0 |
| Magnesium oxide | 8.0 |
| Hexadecanesulfonic acid | 10.0 |
| Total | 100.0 |

The composition obtained by blending and reacting the above component materials has a spread area of 4.4 cm.$^2$ and has a cream-like appearance. The spread area after storing it for 30 days at temperatures of 20° C.±1° C. is also 4.4 cm.$^2$. Scales on high silicon iron (containing 0.5% of carbon, 15.5% of silicon, 0.4% of manganese, 0.07% of phosphorus and 0.02% of sulfur) can be removed by applying this composition for 1 hour.

EXAMPLE 17

| | Percent |
|---|---|
| Hydrofluoric acid (55% concentration) | 20.0 |
| Magnesium nitride (hexahydrate) | 70.0 |
| Benzenesulfonic acid | 5.0 |
| Water | 5.0 |
| Total | 100.0 |

The composition obtained by blending and reacting the above component materials has a spread area of 1.7 cm.$^2$, and the spread area after storing it for 6 months at normal (room) temperature is 1.6 cm.$^2$. Welding-scales on stainless steel (of AISI 304) can be removed by applying this composition for 2 hours.

EXAMPLE 18

| | Percent |
|---|---|
| Hydrofluoric acid (55% concentration) | 30.0 |
| Phosphoric acid (75% concentration) | 10.0 |
| Magnesium nitride (hexahydrate) | 40.0 |

| | Percent |
|---|---|
| Magnesium carbonate | 12.0 |
| Water | 13.8 |
| Dodecylbenzenesulfonic acid | 1.0 |

(Resultant composition becomes 100.0%)

The composition obtained by blending and reacting the above component materials has a spread area of 5.1 $cm.^2$ and a cream-like appearance. Welding-scales on stainless steel (of AISI 304) can be removed in 1 to 2 hours by application of this composition. The spread area after storing it for 3 months at normal temperature is 5.2 $cm.^2$.

The composition prepared by adding 1% of potassium sulfate can remove said scales in a time that is 20% shorter than with the above composition, and it exhibits a spread area of 5.0 $cm.^2$ right after its preparation as well as after storing it for 3 months at normal temperatures.

As can be easily surmised from the above description, the composition or "compound" of the present invention can clean a metal surface, as well as etch a metal surface, because the cleaning operation is a combination of removing non-metallic deposits from the metal surface and a slight etching of the surface of the metal.

The invention being thus described, it will be obvious that the same may be varied in many ways. Such variations are not to be regarded as a departure from the spirit and scope of the invention, and all such modifications as would be obvious to one skilled in the art are intended to be included herein.

It is claimed:

1. A composition for etching and cleaning metal surfaces comprising hydrofluoric acid, magnesium and at least one acid or salt of an acid selected from the group consisting of nitric acid, phosphoric acid, sulfuric acid and sulfonic acids having the formula $XSO_3H$, wherein X is an aryl, alkaryl or alkyl radical.

2. The composition according to claim 1, wherein the sulfonic acid is an aryl or alkaryl sulfonic acid containing up to 28 carbon atoms.

3. The composition according to claim 1, wherein the sulfonic acid is dodecylbenzene sulfonic acid.

4. The composition according to claim 1, wherein the sulfonic acid is an alkyl sulfonic acid containing from 6 to 30 carbon atoms.

5. A composition for etching and cleaning metal surfaces comprising hydrofluoric acid, magnesium and at least one acid or salt of an acid selected from the group consisting of sulfonic acids having the formula $XSO_3H$, wherein X is an aryl, alkaryl or alkyl radical.

6. The composition according to claim 5, wherein X is an aryl or alkaryl radical containing up to 28 carbon atoms.

7. The composition according to claim 5, wherein X is an alkyl radical containing from 6 to 30 carbon atoms.

8. A composition for etching and cleaning metal surfaces comprising hydrofluoric acid, magnesium and at least one acid or salt of an acid selected from the group consisting of sulfonic acids having the formula $XSO_3H$, wherein X is an aryl, alkaryl or alkyl radical, and at least one member selected from the group consisting of nitric acid, phosphoric acid, sulfuric acid and salts thereof.

9. A composition for etching and cleaning metal surfaces comprising about 1–65% by weight of hydrofluoric acid, about 0.1–20% by weight of magnesium and at least one acid or salt of an acid selected from the group consisting of about 1–70% by weight of nitric acid, about 1–90% by weight of phosphoric acid, about 0.1–90% by weight of a sulfuric acid and about 0.1–98% by weight of a sulfonic acid having the formula $XSO_3H$, wherein X is an aryl, alkaryl or alkyl radical.

10. The composition according to claim 9, wherein the sulfonic acid is selected from the group consisting of aryl or alkaryl sulfonic acids of up to 28 carbon atoms and alkyl sulfonic acids of 6 to 30 carbon atoms.

11. The composition according to claim 9, wherein the sulfonic acid is dodecylbenzene sulfonic acid.

References Cited

UNITED STATES PATENTS

| | | | |
|---|---|---|---|
| 3,010,854 | 11/1961 | Satterfield | 156—22UX |
| 3,053,719 | 9/1962 | Jones et al. | 156—18 |
| 3,067,080 | 12/1962 | Kaveggia et al. | 252—79.4UX |
| 3,134,702 | 5/1964 | DeLong et al. | 252—79.4UX |

WILLIAM A. POWELL, Primary Examiner

U.S. Cl. X.R.

134—3, 41; 156—18, 22; 252—79.4